United States Patent [19]

Kristensen

[11] Patent Number: 4,828,180

[45] Date of Patent: May 9, 1989

[54] AUTOMOBILE CLEANING SYSTEM AND PORTABLE UNIT THEREOF

[76] Inventor: Henning Kristensen, 12 Mitchell Ave., E. Brunswick, N.J. 08816

[21] Appl. No.: 22,116

[22] Filed: Mar. 5, 1987

[51] Int. Cl.$^4$ .......................... B05B 9/03; B05B 11/00
[52] U.S. Cl. .................................... 239/302; 239/332; 239/348; 239/526; 417/317
[58] Field of Search ................... 239/525, 347, 533.15, 239/93, 526, 348, 302, 332; 417/316, 317, 14

[56] References Cited

U.S. PATENT DOCUMENTS 3,107,059 10/1963 Frechette .......................... 239/348
3,207,444 9/1965 Kelley et al. ..................... 239/347
4,222,525 9/1980 Hildebrandt ..................... 239/348

FOREIGN PATENT DOCUMENTS 18038 1/1929 Australia ............................. 239/348
415248 8/1934 United Kingdom ................ 239/348

Primary Examiner—Andres Kashnikow
Assistant Examiner—Christopher G. Trainor
Attorney, Agent, or Firm—Robin, Blecker & Daley

[57] ABSTRACT

An automobile cleaning system comprises a source of cleaning fluid and control apparatus connected to the source and responsive to a control input for pressurized output of the cleaning fluid. The system has also a source of pressurized medium, such as positively or negatively (vacuum) pressurized air. A portable unit for issuance of the pressurized cleaning fluid has a first channel with an input port connected to the control apparatus for receipt of the pressurized cleaning fluid and an output port for fluid issuance and has a second channel with an input port connected to the pressurized air source and an output port at a surface of the portable unit for closure upon blockage by a user of the system. A conduit is provided to conduct indication of second channel blockage to the control apparatus as the control input thereto.

4 Claims, 2 Drawing Sheets

AUTOMOBILE CLEANING SYSTEM AND PORTABLE UNIT THEREOF

FIELD OF THE INVENTION

This invention relates generally to automobile cleaning equipment and pertains more particularly to systems and apparatus for use in self-service automobile washing stations.

BACKGROUND OF THE INVENTION

The several commercially known versions of self-service automobile washing systems fall into two basic categories, both involving in common the pressurized issuance of a cleaning fluid from a portable user-held spray wand.

In one type of system, the portable unit is without valving, being simply a passive issuance device. The valving of cleaning fluid is effected by a valve located remotely from the portable unit, such as at the fixedly located pressurized source of the cleaning fluid. such valve may be controlled by a timing unit, or by an electrical switch and associated electrical conductors connecting the portable unit to the valve. A disadvantage of this system type is the undesired presence of electrical energy and necessary electrical insulation in the portable unit. A further shortcoming is that there is not an automatic turn-off feature in the portable unit, i.e., should the user drop the unit, cleaning fluid issuance continues.

In the other type of system, the portable unit includes a valve, typically not of electrical variety and having a spring-loaded user controlled operating stem. This type of system has clear advantage over that discussed above in several respects. Thus, no electrical energy is present in the portable unit and, upon a user dropping the portable unit, it self-deactivates. Such advantages are gained, however, at the cost of structural complexity of the portable unit, in respect of both the presence of the valve therein and such spring-loading mechanism therewith.

SUMMARY OF THE INVENTION

The present invention has as its primary object the provision of an improved self-service automobile washing system and simplified portable units for use therein.

A more particular object of the invention is to provide an improved system of the second above discussed type, however, without the enumerated disadvantages thereof as heretofore known.

In the effective attainment of the foregoing and other objects, the invention provides an automobile cleaning system comprising a source of cleaning fluid and control apparatus connected to such source and responsive to a control input for pressurized output of the cleaning fluid. The system has also a source of pressurized medium, such as positively or negatively (vacuum) pressurized air.

The portable unit of the invention for issuance of such pressurized cleaning fluid has a first channel with an input port connected to the control apparatus for receipt of the pressurized cleaning fluid and an output port for such fluid issuance and has a second channel with an input port connected to the pressurized air source and an output port at a surface of the portable unit for closure upon blockage by a user of the system. A conduit is provided to conduct indication of such second channel blockage to the control apparatus as such control input thereto.

In operation and use of the system of the invention, a user grasps the portable unit and, to commence cleaning fluid issuance, places a finger over the second channel output port. This changes the pressure condition in such conduit and the conduit pressure change is sensed by the control apparatus, such change in pressure being the aforesaid control input thereto. The control apparatus responds to this input to issue pressurized cleaning fluid therefrom, as by initiating operation of a pump therein receiving unpressurized fluid from the fluid source. Automobile cleaning accordingly commences and continues until such time as the user's finger is removed from the output port of the second channel of the portable unit. This event can evidently occur with intent of the user, or by accidental dropping of the portable unit.

In its apparatus aspect, the invention provides a portable unit for use in the issuance of pressurized cleaning fluid in automobile cleaning, comprising a housing having a first channel with an input port for receipt of pressurized cleaning fluid and an output port for issuance thereof, and a second channel having an input port for receipt of a pressurized control medium and an output port at a surface of the housing for closure upon blockage by a user of the portable unit.

The foregoing and other objects and features of the invention will be further understood from the following detailed description of preferred embodiments thereof and from the drawing wherein like reference numerals identify like parts and components throughout.

DETAILED DESCRIPTION OF PREFERRED EMBODIMENTS

Figure 1:
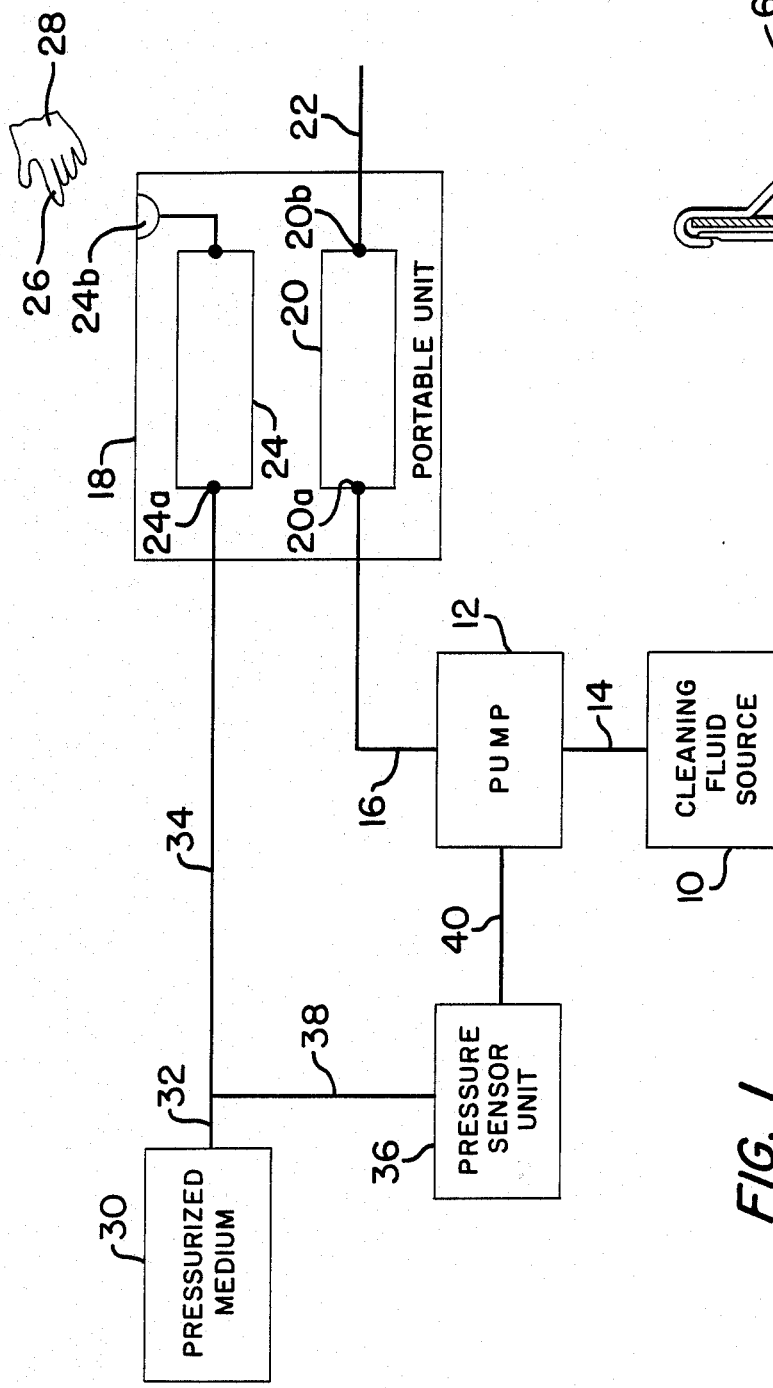
FIG. 1 is a functional block diagram of a system in accordance with the invention.

Referring to FIG. 1, a system configured in accordance with the invention includes a source 10 of automobile cleaning fluid and a pump 12 receiving such cleaning fluid from source 10 over line 14. Line 16 conducts cleaning fluid, now under positive pressure as provided by pump 14, to portable unit (handle housing) 18, and particularly to input port 20a of channel 20 thereof. Channel 20 extends through housing 18, which has cleaning fluid issuing output port 20b connected to spray head or wand 22.

Housing 18 includes another channel 24 having input port 24a and output port 24b which is contiguous with and hence accessible at exterior surface 18a of housing 18. Output port 24b is adapted to be blocked by a finger 26 of the hand 28 of a user of the system of FIG. 1.

The FIG. 1 system further includes a source 30 of pressurized medium, which maybe positively or negatively (vacuum) pressurized air. Such medium is applied to conduit 32 and thence, through conduit 34, to input port 24a of channel 24 of portable unit 18.

Additional components of the FIG. 1 system include pressure sensor unit 36, connected to conduits 32 and 34 by line 38, and line 40 which conducts the output of sensor unit 36 to pump 12.

In operation and use of the system of the invention, a user grasps portable unit 18 and, to commence cleaning fluid issuance, places a finger over second channel output port 24b. This changes the pressure condition in conduits 34 and 38 and the conduit pressure change is sensed by unit 36, such change in pressure being the aforesaid control input thereto. The control apparatus, which comprises unit 36 and pump 12, responds to this input to issue pressurized cleaning fluid therefrom, by initiating operation of the pump receiving unpressurized fluid from the cleaning fluid source. Automobile cleaning accordingly commences and continues until such time as the user's finger is removed from the output port of the second channel of the portable unit. This event can evidently occur with intent of the user, or by accidental dropping of the portable unit.

Figure 3:
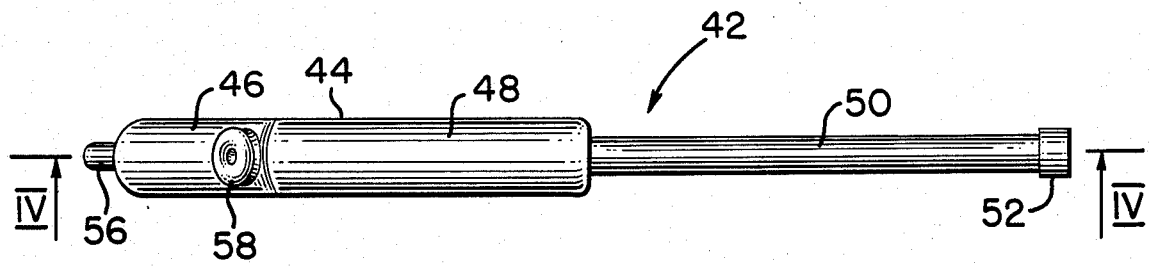
FIG. 3 is a top plan elevation of the FIG. 2 portable unit.
Figure 2:
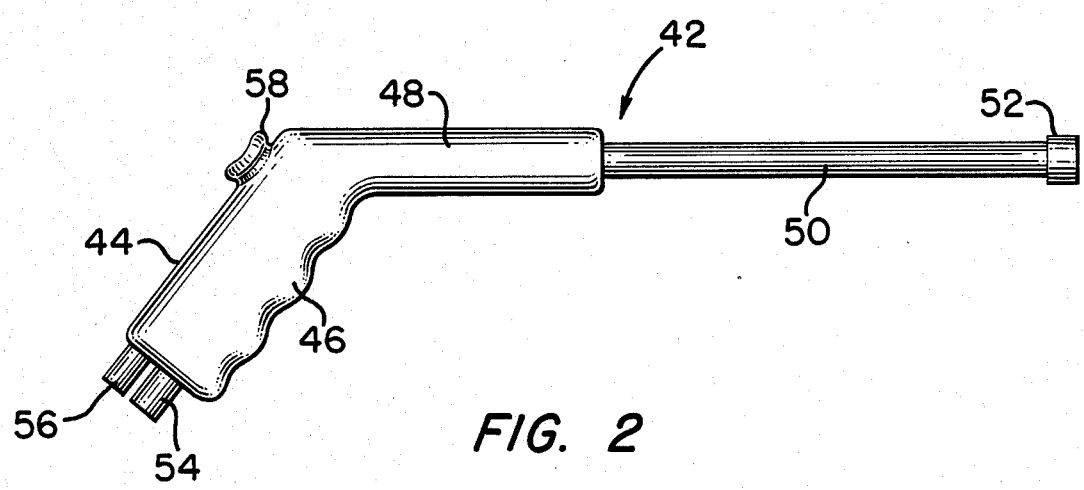
FIG. 2 is a side elevation of an embodiment of a portable unit of the FIG. 1 system.
Figure 4:
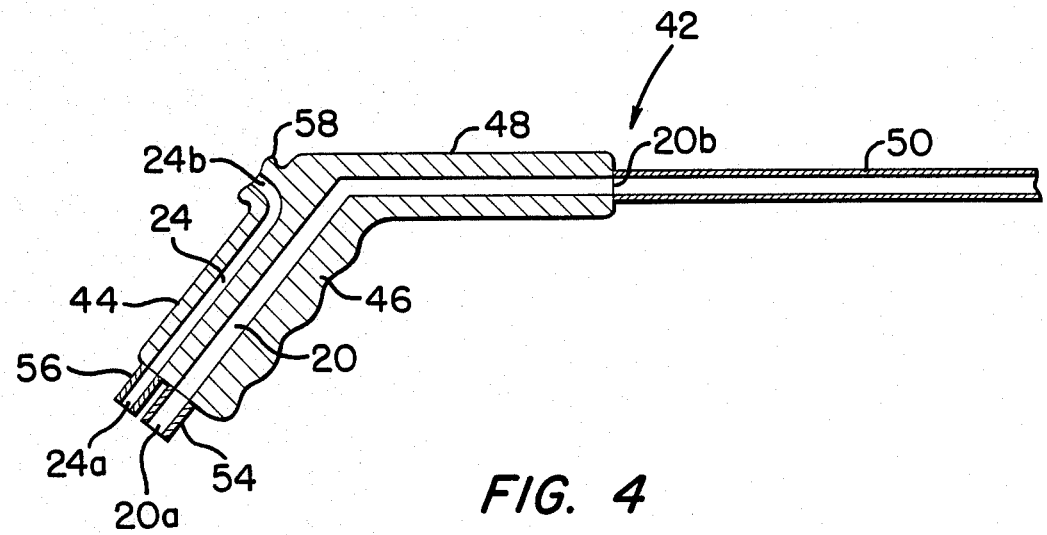
FIG. 4 is a sectional view of the FIG. 2 portable unit as would be seen from plane IV—IV of FIG. 3.

Turning to FIGS. 2–4, portable unit 42 is in the form of a pistol-like housing 44, having a grip 46 and a barrel 48, with wand 50 extending to issuance nozzle 52. At the base of grip 46 are provided fittings 54 and 56 defining the inlet ports 20a and 24a of channels 20 and 24.

As is seen, channel 20 extends fully lengthwise through grip 46 and barrel 48. Channel 24, on the other hand, extends lengthwise into grip 46 but diverts arcuately to exit grip 46 sidewardly, preferably through an opening formed in a rib 58 terminating outwardly of the surface of grip 46. The outward surface of rib 58 may be contoured about the opening to be readily adapted to sealingly receive a human finger.

Figure 5:
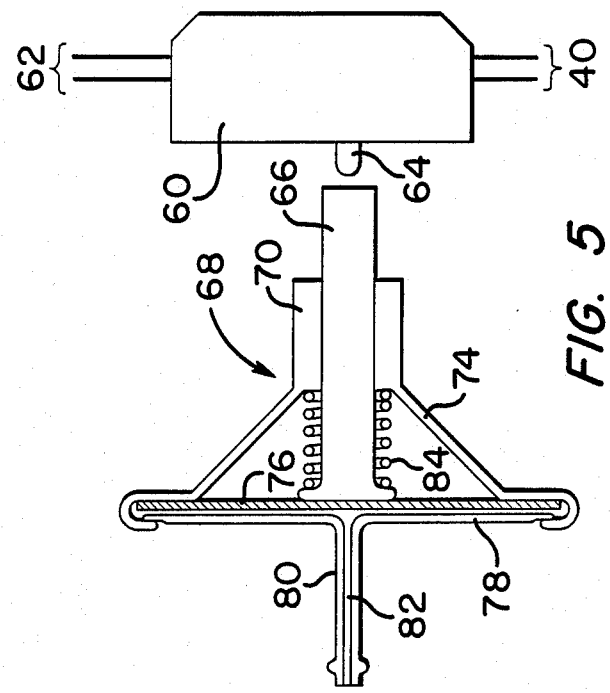
FIG. 5 is a schematic view of an embodiment of the pressure sensor unit of the FIG. 1 system.

An embodiment of pressure sensor unit 36, for use with a positively pressurized medium in unit 30, is seen in FIG. 5. Switch 60 has input power lines 62, i.e., at customary alternating current line voltage or any suitable direct current voltage level, depending on the character of the motor of pump 12. Switch 60 output lines are lines 40, which are connected to the pump 12 motor. Toggle 64 is depressed, by rightward movement of plunger 66, to close switch 60 and energize lines 40.

Housing 68 of FIG. 5 has a cylindrical part 70 encircling plunger 66 and supporting movement thereof. Flared part 72 of housing 68 extends leftwardly to a circumferential flange 74, which retains therein diaphragm 76 in facing relation to head 66a of plunger 66, and a rigid plate 78. Plate 76 has a fitting 80 extending leftwardly thereof and defining conduit 82.

Line 38 of FIG. 1 is connected to fitting 80, whereby positively pressurized medium can enter conduit 82 and displace diaphragm 76, and hence plunger 66 to operate switch 60. Spring 84 is disposed between plunger head 66a and housing part 70, in encircling relation to plunger 66, to bias plunger out of contact with toggle 64 of switch 60.

As will be seen from the foregoing, the invention has, in a system aspect, a source of cleaning fluid, control means connected to the source of cleaning fluid and responsive to a control input for pressurized output of the cleaning fluid therefrom, a source of pressurized medium, portable means for issuance of such pressurized cleaning fluid and having a first channel having an input port connected to the control for receipt of the pressurized cleaning fluid and an output port for such fluid issuance, and a second channel having an input port connected to the pressurized medium source and an output port at a surface of the portable means for closure upon blockage by a user of said system and means for conducting indication of such second channel blockage to the control means as such control input thereto.

In its article aspect, the invention provides a portable unit for use in the issuance of pressurized cleaning fluid in automobile cleaning, which comprises a housing having a first channel having an input port for receipt of such pressurized cleaning fluid and an output port for issuance thereof, and a second channel having an input port for receipt of a pressurized medium and an output port at a surface of the housing for closure upon blockage by a user of the portable unit. In a preferred form, the housing comprises a hard-grippable portion, the second channel extending lengthwise through the hand-grippable portion from the second channel input port and extend transversely in said hand-grippable portion to the second channel output port.

Various changes may be introduced in the foregoing system and its illustrated components. Thus, the portable unit may take on various other configurations, for example, fully straight as contrasted to the illustrated pistol configuration. The pressure senstive unit of FIG. 5 can also be of other type, i.e., as discussed above, to be responsive to negatively pressurized medium in operating switch 60. Accordingly, the particularly described and discussed preferred embodiment is intended in an illustrative and not in a limiting sense. The true spirit and scope of the invention is set forth in the following claims.

I claim:
1. An automobile cleaning system comprising:
   (a) a source of cleaning fluid;
   (b) means connected to said source of cleaning fluid and energizable in response to a control input for causing a pressurized output of said cleaning fluid therefrom;
   (c) a source of pressurized medium;
   (d) portable means for issuance of said pressurized output of said cleaning fluid having
      (I) a first channel having an input port connected to said means for causing a pressurized output of said cleaning fluid for receipt of said cleaning fluid and an output port for said issuance of said cleaning fluid, and
      (II) a second channel having an input port connected to said source of pressurized medium and an output port at a surface of said portable means for closure upon blockage by a user of said system
   said portable means isolating said first channel and said second channel from one another and further isolating said second channel from said source of cleaning fluid; and
   (e) means for conducting indication of said second channel blockage to said means for causing a pressurized output of said cleaning fluid as said control input thereto.

2. The invention claimed in claim 1 wherein said source of pressurized medium comprises a source of positively pressurized air.

3. The invention claimed in claim 1 wherein said source of pressurized medium comprises a source of negatively pressurized air.

4. The invention claimed in claim 1 wherein a first conduit is provided for interconnecting said source of pressurized medium with said input port of said second channel of said portable means, and wherein said means for conducting indication of said channel blockage comprises a second conduit interconnecting said first conduit and said means for causing a pressurized output of said cleaning fluid.

* * * * *